United States Patent [19]

Hunter

[11] 4,119,275
[45] Oct. 10, 1978

[54] FLUID SPRAY HEAD AND METHOD ADAPTED TO SPRAY SPECIFIC PATTERN

[75] Inventor: Edwin J. Hunter, Rancho Santa Fe, Calif.

[73] Assignee: The Toro Company, San Marcos, Calif.

[21] Appl. No.: 764,183

[22] Filed: Jan. 31, 1977

[51] Int. Cl.² .................. B05B 1/14; B05B 1/30; B05B 15/10
[52] U.S. Cl. .................. 239/456; 239/561; 239/562; 239/574; 239/DIG. 1
[58] Field of Search .................. 239/1, 11, 201–206, 239/451, 456–458, 460, 537–540, 552, 562, 568, 574, 601, DIG. 1, 561; 285/13

[56] References Cited

U.S. PATENT DOCUMENTS

| 2,796,293 | 6/1957 | Becker | 239/204 |
|---|---|---|---|
| 3,454,225 | 7/1969 | Hunter | 239/552 X |
| 3,797,112 | 3/1974 | Paulson | 285/13 X |
| 3,940,066 | 2/1976 | Hunter | 239/204 |

FOREIGN PATENT DOCUMENTS 439,369  12/1935  United Kingdom .................. 239/456

Primary Examiner—Bruce H. Stoner, Jr.
Assistant Examiner—Andres Kashnikow
Attorney, Agent, or Firm—Poms, Smith, Lande & Glenny

[57] ABSTRACT

An improved fluid spray head for sprinkler apparatus is disclosed adjustable both as to the flow rate of fluid to the discharge orifices and the precipation rate over the ground area sprayed, and particularly adapted to spray a specifically shaped non-circular area. The spray head has a plurality of circumferentially-spaced discharge orifices having cross-sectional areas equally proportional to the square of the distance that their respective spray streams are desired to travel whereby the perimeter of the ground area sprayed defines the preselected shape and receives a substantially uniform coverage of fluid.

In a preferred embodiment, the spray head includes an inner tubular member which telescopes within an outer tubular member to provide the simultaneous adjustment of the size of the discharge orifices and wherein the inner tubular member is made radially thinner so as to be more pressure expandable under fluid pressure to thereby tighten the fluid seal between the inner tubular member and the outer tubular member.

Methods for constructing and operating a fluid spray head adapted to spraying a specific pattern or shaped area are also disclosed.

13 Claims, 7 Drawing Figures

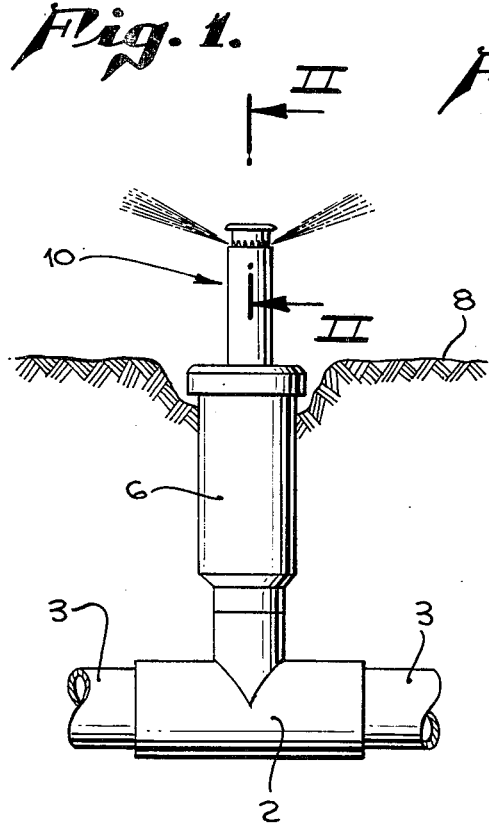
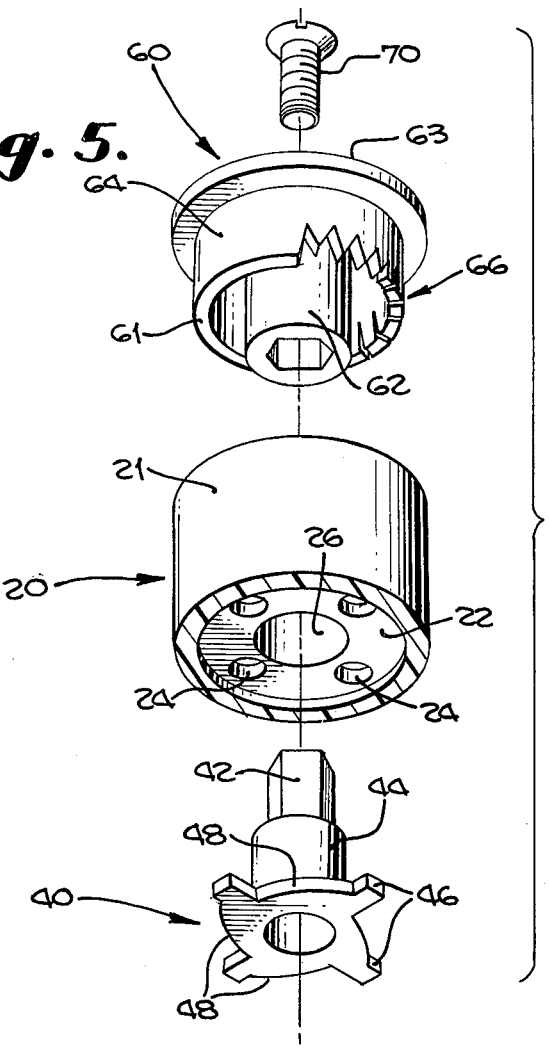
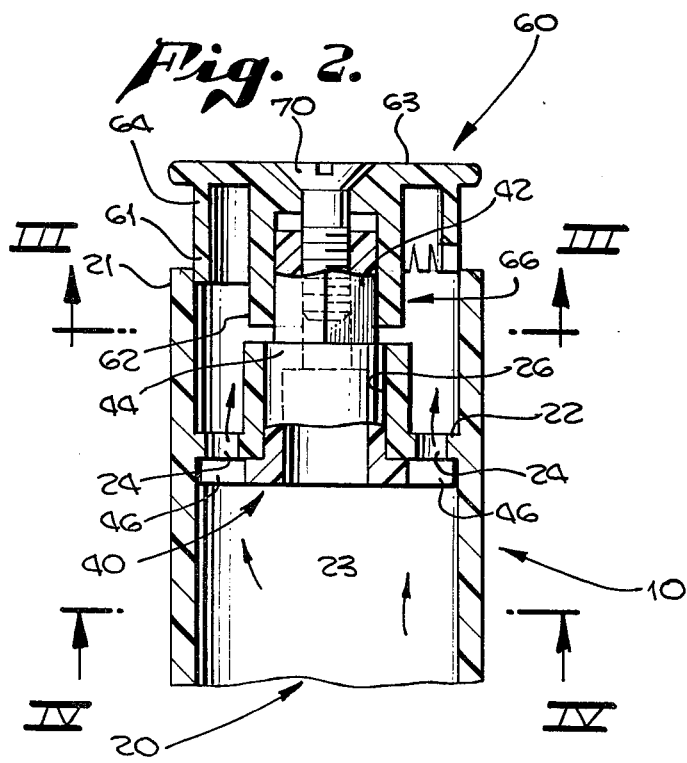
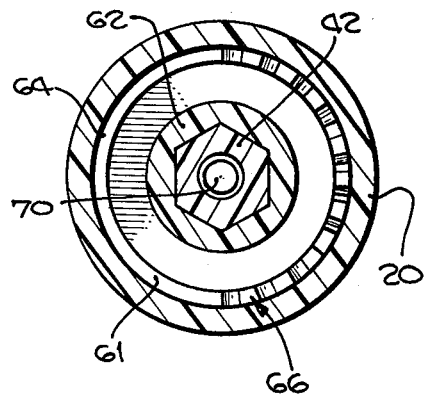

FLUID SPRAY HEAD AND METHOD ADAPTED TO SPRAY SPECIFIC PATTERN

BACKGROUND OF THE INVENTION

1. Field of the Invention

This invention relates generally to fluid spray apparatus, particularly to irrigation devices, and more particularly to an improved fluid spray head for sprinkler apparatus.

2. Description of the Prior Art

A wide variety of irrigation apparatus and sprinklers have been devised to provide proper irrigation to lawns and other vegetation. Irrigation sprinklers may be generally classified as either fixed discharge or moving discharge sprinklers.

A moving discharge sprinkler is characterized by a movable spray head which directs one or more water streams outwardly from the head of the sprinkler in a predetermined direction in cyclic or oscillatory pattern to sweep over the area to be irrigated. Moving discharge sprinklers have the advantage of low precipitation rates, which allows them to distribute a relatively small flow of water over a relatively large area. However, such moving sprinklers tend to be complex in construction, costly to manufacture, subject to wear and malfunction, and sensitive to water flow rates and pressures. The coverage of these sprinklers is adversely effective by the wind and they are ill-suited to small and/or non-circular shaped areas. They are generally incapable of adequate trimming, that is, spraying along, but not appreciably beyond the border of an irrigation area. In view of their necessity to rotate or oscillate, a relatively large area of movement is required. Accordingly, moving sprinklers are not satisfactory for all uses.

Typical fixed discharge sprinkler systems normally have a stationary spray head which directs a number of discrete diverging streams of water or a generally continuous fan-shaped spray of water spreading outwardly from the spray head over a predetermined angular sector. Fixed discharge sprinklers have the advantages of maximum simplicity, low cost, reliability, immunity to wear, and the ability to irrigate small or non-circular shaped areas, and to adequately trim the borders of such areas. The chief disadvantage of fixed discharge sprinklers is that they continuously deliver a relatively large flow of water to a relatively small area and thus produce relatively high precipitation rates over the area.

The problem of the characteristicly inflexible operation of fixed discharge sprinklers is further compounded by the fact that they are usually operated in groups from a common control valve. These control valves are usually controlled or operated by a single manual or automatic controller which causes all of the sprinklers to deliver approximately the same amount of water to the areas surrounding the respective sprinklers. Thus, some areas which require less water are over watered, while areas requiring more water are under watered.

Various prior art devices have attempted to eliminate the disadvantages of selective flow control and precipitation rates in fixed discharge irrigation sprinkler systems. U.S. Pat. No. 3,454,225 and No. 3,940,066 issued to E. J. Hunter disclose means for controlling the precipitation rate from a fluid spray head and a specific means for adjusting the fluid flow rate of a spray head in a pop-up sprinkler by rotating the tubular riser. U.S. Pat. No. 3,454,225 provides a means for adjusting the precipitation rate with a spray head which telescopes in and out of the main tubular body to thereby decrease or increase the effective size of the orifices.

However, a problem with sprinkler systems having a spray head which is telescopingly adjustable within the main tubular body is that the engagement between the tubular portion of the spray head and main tubular body is not fluid tight and that after much use, or during conditions of high fluid pressure, leaking results.

Another problem with fixed discharge sprinkler systems is that they have been limited in the shape or pattern of area which they can cover. In prior spray heads, the shape of the irrigated areas has been determined by the placement of or lack of orifices positioned around the spray head. However, this method of spray head design is very limited in the shape or pattern of areas it can spray.

However, while some of the above problems have been eliminated in some appratus by specific constructions, it has nevertheless been desirable to have a sprinkler apparatus having the combined ability to adjust the flow rate, the precipitation rate, and to provide for the uniform fluid coverage of any desired shape, and having this combined ability in a simple, single adjustment means.

Accordingly, the principal object of this invention is to provide a sprinkler apparatus having a fixed discharge fluid spray head capable of adjusting the fluid flow rate, the precipitation rate, and to provide uniform fluid coverage for any desired shape area.

Another object is to provide a fluid spray head which can adjust the flow of water into the spray head of a sprinkler system.

Yet another object is to provide a sprinkler system having a telescopingly adjustable spray head within a tubular main body wherein the problem of leaking through the sliding engagement is eliminated.

A still further object of this invention is to provide a method of constructing a fluid spray head which is adapted to spray a preselected shaped ground area.

Yet another object is to provide a method of spraying a preselected shaped ground area.

SUMMARY OF THE INVENTION

Briefly, the invention comprises a sprinkler apparatus whose spray head includes a generally tubular outer member having an axial fluid passageway and a bulkhead for restricting the flow of fluid through the passageway; a generally tubular inner member having a cap end, and an open tubular end slidably engaging with the outer member, said tubular end being more pressure expandable under fluid pressure than the outer member so as to prevent fluid leaks from the passageway, and having a plurality of circumferentially-disposed discharge orifices whose cross-sectional area progressively vary so that the perimeter of the ground area sprayed defines a preselected shape; and flow adjusting means for variably adjusting the restriction of fluid flow by the bulkhead; said means being operated by rotating the inner member relative to the bulkhead.

In the preferred embodiment, the inner member is made more pressure expandable under fluid pressure by the inner member being radially thinner than the outer member.

A more complete and thorough understanding of the improvements of the spray head and sprinkler apparatus of the present invention will be afforded to those skilled in the art from a consideration of the following detailed description of the preferred embodiment of the invention, and particularly when considered in conjunction with the accompanying drawings.

BRIEF DESCRIPTION OF THE DRAWINGS

FIG. 1 is a side-elevational view of the improved sprinkler apparatus of this invention, illustrating the sprinkler installed in a permanent underground sprinkler system and showing the improved spray head of this invention in use;

FIG. 2 is a cross-sectional view of the improved spray head of this invention, taken along the line II—II of FIG. 1;

FIG. 3 is a cross-sectional view of the spray head taken along the line III—III of FIG. 2;

FIG. 5 shows the spray head of this invention in an exploded, perspective view;

DETAILED DESCRIPTION OF THE INVENTION

Figure 4:
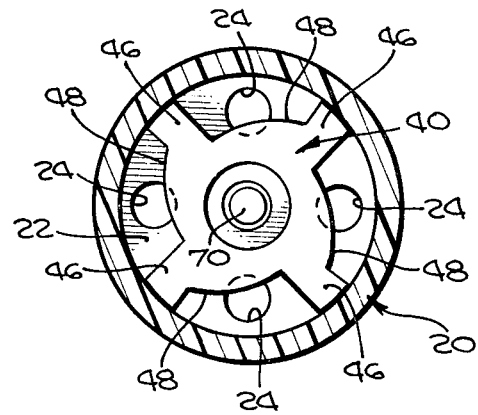
FIG. 4 is a cross-sectional view of the spray head in FIG. 2 taken along the line IV—IV.

Referring now particularly to FIG. 1, there is shown the improved fluid spray head 10 of the present invention in one of its applied environments. Underground irrigation pipes 3, which are connected to a source of pressurized water, not shown, are permanently positioned underneath ground 8 and are connected by tee coupling 2 to sprinkler head housing 6. In this illustration, fluid spray head 10 is of the pop-up type and is shown in its fully-extended, operating position. Exemplary pop-up sprinklers are described in my patents U.S. Pat. No. 3,454,225 and No. 3,940.066. However, the improved fluid spray head of the present invention can be used in any type of sprinkler or fluid spray apparatus, such as a single, portable, above-ground spinkler.

Referring generally now to FIGS. 2–5, the construction and operation of the fluid spray head of this invention will be described. FIG. 2, a cross-sectional view of the spray head of FIG. 1, discloses an outer tubular member 20 which possesses an axial passageway 23 which provides spray head 10 with fluid from a source of pressurized fluid. Outer tubular member 20 has a bulkhead 22 disposed within the axial passageway 23. The bulkhead 22 is provided with a plurality of bulkhead orifices 24 disposed near the radial edge of the bulkhead. The bulkhead orifices 24 provide the only fluid passage for the fluid to the discharge orifices 66 in the cap 60 of the spray head 10.

The bulkhead 22 has integrally attached to it a sleeve means 26 for holding a flow adjuster means 40 in position for rotating adjustment to vary the effective size of the bulkhead orifices 24.

The top of the spray head 10 is provided with an inner tubular member 60 with a top closed cap 63 and an open tubular end 64 with a cap skirt 61. Inner tubular member 60 fits slideably within outer tubular member 20 so that it provides a tight fluid seal engagement at its mating surfaces and so that it may be adjusted up and down for a purpose to be described hereinafter.

As more clearly shown in FIG. 5, flow adjuster 40 is provided at its middle section with an integral rotatable cylinder 44 which is received within the flow adjuster holding sleeve 26. The top of the flow adjuster 40 is provided with an integral hexagon arm which is adapted to be received within and held by a hexagon sleeve 62 integral with the inner tubular member 60. The fitting connection between the hexagon arm 42 of the flow adjuster 40 and the hexagon sleeve 62 of the inner tubular member 60 allows the flow adjuster 40 to be rotatably adjusted by manually rotating the inner tubular member 60. The inner tubular member 60 may be manually rotated by grasping the outer rim of the cap 63 with one's fingers.

Referring now to FIG. 4 and FIG. 5, the bottom of flow adjuster 40 is provided with an integral flat, radially projecting section which smoothly abuts the bottom surface of bulkhead 22. This flat section is designed to correspond to the number of bulkhead orifices 24, and is provided with an appropriate number of variable flow portions 48 which gradually vary in radial extension. This enables the flow adjuster 40 to vary the effective size of the bulkhead orifices 24 to variably control the flow of fluid to the discharge orifices 66. The flat section is also provided with an appropriate number of flow cut-off portions 46, which when rotated into position will completely restrict the flow of fluid from passage 23 to the discharge orifices 66.

Referring now to FIG. 2 and FIG. 5, the spray head 10 is provided with a plurality of discharge orifices 66 which are circumferentially-disposed about the spray head 10 to an extent so as to provide the proper angular spray pattern (e.g. 45°, or 90°, etc.). However, as discussed above, it is desirable to be able to spray areas having a shape other than a circle or a sector of a circle.

While the discharge orifices of this invention may take any configuration, and be constructed in either the outer tubular member or the inner tubular member, in the preferred embodiment the discharge orifices 66 are triangularly shaped and are defined by the cooperation between the cap skirt 61 and the top annular edge of the outer tubular member 20.

A single discharge orifice 66 is characterized by an effective discharge opening of generally triangular shape bounded by converging sides which meet at an apex, and by a base opposite the apex. In the preferred embodiment, the base is the top annular edge of the outer tubular member, and the converging sides of the discharge orifices are provided by a plurality of inverted V-shaped openings or slots, seen best in FIG. 5.

A discharge orifice adjusting means is provided in the preferred embodiment, and in this embodiment the cross-sectional area of the orifices are varied by axially adjusting the inner tubular member 60 relative to the outer tubular member 20 so that the base of the triangularly-shaped orifices moves away from or closer to the apex of the triangular opening depending on the adjustment made.

Referring now to FIG. 2 and FIG. 5, there is shown axial adjusting screw 70 which passes through an opening in the top of closed cap 63 and extends down and threadably engages the central portion of the hexagon arm 42. By screwing axial adjustment screw 70 in or out of the hexagon arm 42, the cross-sectional area of the discharge orifices 66 can be varied without altering their basic geometrical, triangular proportions.

As mentioned hereinabove, spray heads of the type disclosed herein, having an outer tubular member and a slideably engaging inner tubular member have experienced leaking between the engagement of the respective surfaces. This problem has increased with the age and continual sliding of the inner member, and is made more acute by high fluid pressure within the spray head.

The spray head of this invention provides a sealing means which provides a tighter fluid seal with increasing fluid pressure within the spray head. This is accomplished by constructing a spray head whose inner tubular member is more pressure expandable than the outer tubular member with which it is engaged. This will cause the inner member to attempt to expand more than the outer member, with the result that the fit between the two will tighten appreciably. Among the ways to provide a more pressure expandable inner member is to make the cap skirt 61 of the same material as the cap skirt engaging portion 21 of the outer member and to make it radially thinner so that its tendency to expand under pressure is greater than the outer member's tendency to expand. The same result can also be accomplished by fabricating the inner tubular member with a cap skirt of a material different and more pressure expandable than the material of the cap skirt engaging portion of the outer member. In the preferred embodiment of this invention, the inner tubular member 60 and the outer tubular member 20 are made of the same material and the cap skirt 61 is made radially thinner than the cap skirt engaging portion 21 of the outer member 20.

While it is preferred that the cap portion of the spray head be the inner tubular member and slide within the main tubular member, the spray head could also be constructed with the cap having an open end which fits over a smaller main tubular member. Again, in order to provide a tight fluid seal between the sliding surfaces, the inner member is made more pressure expandable than the outer member, whatever construction is employed.

Figure 6:
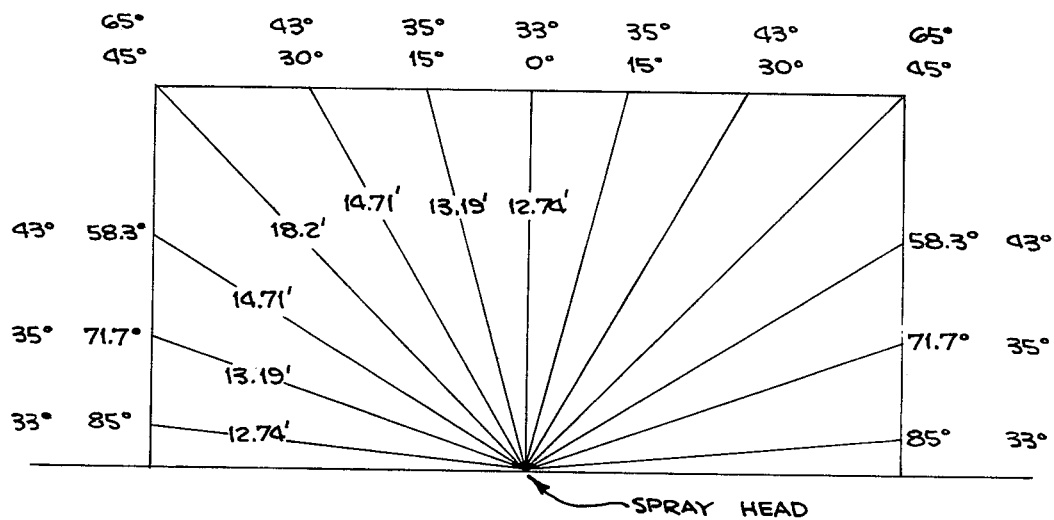
FIG. 6 shows the shape of the ground area which would be sprayed by the spray head orifice configuration shown in FIG. 7.
Figure 7:
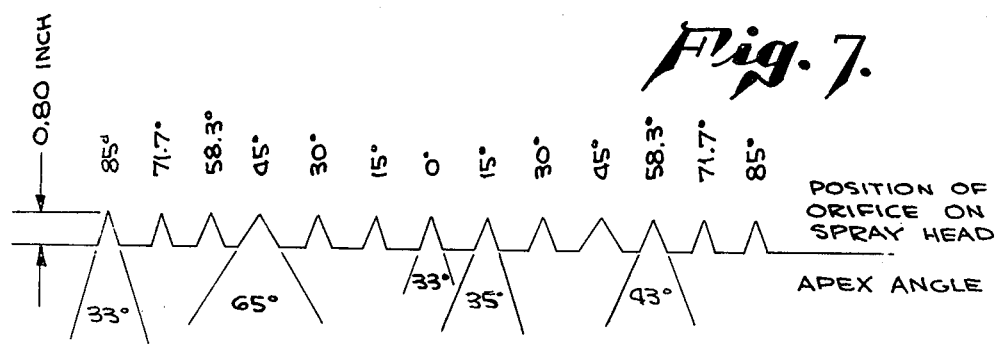
FIG. 7 is a representative diagram of the orifice configuration which would spray the ground area shown in FIG. 6.

Referring now to FIG. 6 and FIG. 7, the method of this invention and the operation of the fluid spray head of this invention will be explained. FIG. 6 represents an area of grass which is desired to be sprayed with water; the area is approximately 12½ by 25 feet and it is desired to place the spray head in the middle of one of the long edges, as shown in the figure.

This invention provides a method of constructing the fluid spray head so that the desired ground area will be completely sprayed and neatly trimmed, and so that the ground area will receive a substantially uniform coverage of water. The fluid spray head will be provided with a plurality of circumferentially-disposed triangularly-shaped orifices. The location and cross-sectional areas of the orifices are determined by the following procedure:

The ground area is divided into a plurality of sectors radiating from the desired location of the spray head, having one sector correspond to one orifice. In view of the desired location of the spray head in this example, the discharge orifices need only be positioned around 180° of the spray head. Next, the approximate distance from the spray head to the edge of each sector is determined so that the desired distance necessary for each spray stream to travel is determined. It is assumed in this example that the fluid spray head will be connected to a source of pressurized water which wil supply the spray head with a normal water flow rate at a normal, constant fluid pressure (e.g. 100 psi).

Next, the discharge orifices are sized so that their respective cross-sectional areas progressively vary around the spray head in a manner that the relative cross-sectional areas of the orifices are proportional to the distances that their respective spray streams are desired to travel. It has been found that if a spray head with a plurality of orifices is provided with a given flow rate at a given pressure, the spray stream discharged from the larger orifice will travel farther, and specifically that the distance the spray stream will travel will increase with the square root of the cross-sectional area. In other words, for a given spray head being supplied with water at a given pressure and a given flow rate, the spray stream discharged from an orifice having four times the cross-sectional area of another orifice will travel twice the distance the spray stream discharged from the smaller orifice will travel. This is quite fortunate for as the distance doubles, the ground area to be sprayed increases fourfold; and because the cross-sectional area of the large discharge orifice is fourfold larger, the volumetric flow rate discharged by the larger orifice is also fourfold larger, thereby ensuring that the sector area sprayed by the larger orifice will receive substantially the same fluid precipitation as the smaller sector.

While the above-described relationship defines the relative sizes of the discharge orifices so that a particular shaped area will be sprayed, the absolute size of each orifice necessary to spray a given sized ground area will be effected by the fluid flow rate and fluid pressure in the line.

In the present example, the orifices are triangularly-shaped, and the based on the size of the area to be sprayed and the given flow rate and line pressure, the orifices are constructed to be 0.08 inches in height. The cross-sectional areas of the orifices are varied according to the relationship discussed above by varying the angle of the apex of the orifice. As the apex angle is increased, the cross-sectional area of the orifice is increased and the distance that the spray stream of that orifice will travel will also increase.

Referring again to FIG. 6, the location of the particular spray head is designated, and has been designed to spray a ground area approximately 12½ by 25 feet. The top of FIG. 6 has been arbitrarily designated as 0°. The orifice corresponding to the 0° position is shown in FIG. 7 and has an apex angle of 33°, and FIG. 6 indicates that this particular spray head at a normal irrigation fluid pressure and flow rate will discharge the spray stream a distance of about 12.74 feet. The height of the orifices is shown to be 0.080 inches in this example. The next two discharge orifices, on each side of the first described orifice, are positioned 15° around the spray head, and have apex angles of 35°, and discharge their spray streams a distance of about 14.71 feet. The remaining orifices, and their corresponding spray distances are shown in the drawings. It is preferred that the orifices be separated by approximately 15° around the spray head. It is also preferred that the apex angle generally vary between about 10° and 65°.

As described earlier in the disclosure, the fluid spray head is provided with a means for axially adjusting the inner tubular member 60 up or down so as to simultaneously increase or decrease the size of all the discharge orifices. If the discharge orifices have been designed for optimum sprinkler performance (i.e. the discharge orifices are not too large so that the fluid merely flows out, or too small so that the fluid is discharged in a fine mist, but rather that the orifices discharge the fluid in coherent streams which spray out over the area to be sprayed), and assuming that the spray head is supplied with a constant flow rate of fluid and at a constant pressure, then simultaneously decreasing the size of all the orifices a small amount will enlarge the ground area sprayed, and simultaneously increasing the size of all the discharge orifices will decrease the size of the ground area sprayed. This phenomena is caused by the fact that, in order to maintain a constant flow rate, the fluid must be discharged through the smaller orifices at a greater velocity resulting in the spray stream travelling a greater distance. Due to the fact that the volumetric flow rate remains constant, enlarging the ground area sprayed will decrease the precipitation rate over a unit ground area; and decreasing the size of the ground area sprayed will effectively increase the precipitation rate over a unit ground area.

Also, as described above, the fluid spray head of this invention may be provided with a flow rate adjustment means. The flow rate adjustment means is able to ensure that the discharge orifices in the spray head will be provided with a desired flow rate and pressure regardless of changes in the line flow rate and pressure. If there is an increase in line pressure and flow rate, the flow rate adjustment means can be adjusted so as to ensure that the discharge orifices will be provided with the same desired flow rate and pressure as they did before the increase in line pressure and flow rate.

By manipulating both the flow rate adjustment means and the axial adjustment means, one is able to increase or decrease the precipitation rate over a fixed size area. In order to increase the precipitation rate over a fixed area, one would adjust the flow rate adjustment means to increase the flow rate and pressure to the discharge orifices (which by itself would increase the distance the spray streams would travel and the size of the area sprayed), and one would also increase the size of all the discharge orifices (which by itself would decrease the distance of the spray stream). By proper adjustment, the net result is that the size of the area sprayed will remain constant, but with an increased flow rate, resulting in an increase in the precipitation rate over a unit area.

It must be pointed out that because the cross-sectional areas (e.g. apex angles) of the spray head must be designed so as to spray a ground area having a specific, continuous perimeter, it is not merely intended that the orifice cross-sectional areas be randomly different, but rather that the cross-sectional areas progressively vary, sometimes increasing, other times decreasing, so that the perimeter of the selected ground area is completely sprayed, no matter what its shape.

Obviously, many modifications and variations of the present invention are possible in light of the above teachings. For example, although the present system is primarily designed for water irrigation systems, it may be used for any fluid dispersing application. It is, therefore, to be understood that within the scope of the appended claims, the invention can be practiced otherwise than as specifically described.

I claim:

1. In a fluid spray head for spraying an area disposed radially about the head comprising a substantially tubular body having an axial passageway open at one end and adapted at that end for communication with a source of pressurized fluid, being closed at its other end, and having a plurality of circumferentially-disposed discharged orifices wherein each orifice sprays a segment of the area, the improvement for spraying an irregularly shaped area with a proportionally matching irregularly shaped spray pattern comprising:
said plurality of discharge orifices being of different cross-sectional areas related to the horizontal distance from the spray head to the edge of the spray pattern segment sprayed by the respective orifice whereby the respective spray streams of said orifices travel for different horizontal distances identically proportionally related to their respective positions in the spray pattern.

2. The fluid spray head defined in claim 1 wherein said discharge orifices are substantially triangularly-shaped orifices which communicate with said passageway, said triangularly-shaped orifices having their bases perpendicular to the axial direction and having their apexes point in the axial direction, and wherein the different cross-sectional areas of said discharge orifices are provided for by the orifices having different apex angles.

3. The fluid spray head defined in claim 2 wherein the apex angle of each orifice is between about 10° and about 65°.

4. The fluid spray head defined in claim 1 wherein additionally said substantially tubular body includes:
means for simultaneously varying the effective cross-sectional area of all the openings in the same proportion.

5. The fluid spray head defined in claim 1 further including:
internal means for adjustably restricting the flow of fluid through the passageway and to the discharge orifices so that the distance that the spray streams travel can be adjusted in response to pressure variations in the source of pressurized fluid.

6. The fluid spray head defined in claim 1 wherein said substantially tubular member comprises:
a first substantially tubular pressure expandable member, containing an axial passageway, being open at both ends, and being adapted at one end for communication with a source of pressurized fluid; and
a second substantially tubular pressure expandable member having a cap with an open substantially tubular end, one of said members fluid-tightly, slidably engaging inside the other outside member, and one of said members having said circumferentially-disposed discharge orifices which communicate with said passageway; and
wherein said inside member, which slides inside the outside member, includes skirt means for being effectively more pressure expandable than the outside member whereby slidable engagement between the two members becomes more fluid tight under conditions of higher fluid pressure within said passageway.

7. A fluid spray head comprising a substantially tubular body having an axial passageway open at one end and adapted at that end for communication with a source of pressurized fluid, being closed at its other end, and having a plurality of circumferentially-disposed discharge orifices each spraying a portion of a spray area wherein the improvement for spraying a preselected shaped area comprises:
said orifices each having a predetermined cross-sectional area such that the relative cross-sectional areas of said orifice openings are chosen to be equally proportional to the square of the distance that their respective spray streams are required to travel in order that the perimeter of the ground area sprayed defines the preselected shape; and,
said discharge orifices being substantially triangularly-shaped orifices which communicate with said passageway, said triangularly-shaped orifices having their bases perpendicular to the axial direction and having their apexes point in the axial direction, the angle of the apex of each orifice being varied to provide said chosen relative cross-sectional area for each of said orifices.

8. The fluid spray head defined in claim 7 wherein the apex angles of the orifices are between about 10° and about 65°.

9. In a fluid spray head comprising a first substantially tubular pressure expandable member, containing an axial passageway, being open at both ends, and being adapted at one end for communication with a source of pressurized fluid, and a second substantially tubular pressure expandable member having a cap with an open substantially tubular end, one of said members fluid-tightly, slidably engaging inside the other outside member, and one of said members having circumferentially-disposed discharge orifices about the tubular member and communicating with said passageway, the improvement comprising:

said inside member which slides inside the outside member including skirt means for being effectively more pressure expandable than the outside member whereby the slidable engagement between said two members becomes more fluid-tight under conditions of higher fluid pressure within said passageway.

10. The fluid spray head defined in claim 9 wherein:
said skirt means and said outside member are of the same material; and,
said skirt means is radially thinner than said outside member.

11. The fluid spray head defined in claim 9 wherein said orifices have openings of predetermined cross-sectional areas such that the relative cross-sectional areas of said orifice openings are identically proportional to the square of the distances that their respective spray streams are desired to travel so that the perimeter of the ground area sprayed defines a preselected shape and the ground area sprayed receives a substantially uniform coverage of fluid.

12. A sprinkler apparatus including a fluid spray head comprising:

a substantially tubular pressure expandable outer member having an axial passageway being open at both ends, being adapted at one end for communication with a source of pressurized fluid, and having internal bulkhead means for restricting the flow of fluid through the passageway;

a substantially tubular pressure expandable inner member having a cap and an open tubular end, fluid-tightly, slidably engaging within the other end of said outer member, said tubular end having skirt means for being effectively more pressure expandable than said outer member whereby the slidable engagement between the tubular end and the outer member becomes more fluid tight under conditions of higher fluid pressure within said passageway, and having a plurality of circumferentially-disposed substantially triangularly-shaped discharge orifices having a predetermined size whose cross-sectional areas are chosen such that the relative cross-sectional areas of said orifice openings are all proportional in the same amount to the square of the distance that their respective spray streams are required to travel whereby the perimeter of the ground area sprayed defines a preselected shape and the ground area sprayed receives a substantially uniform coverage of fluid;

said outer member having an upper annular edge extending across said orifices to define the bases of said triangularly-shaped orifices;

means for axially adjusting said cap relative to the annular edge of said outer member for varying the effective cross-sectional area of said orifices without altering the relative geometric proportions thereof; and flow adjusting means for variably adjusting the restriction of fluid flow by said bulkhead means, said means being operated by rotating said inner member relative to the bulkhead means.

13. The sprinkler apparatus defined in claim 12 wherein:
said triangularly-shaped discharge orifices have their apexes point in the axial direction and have their bases perpendicular to the axial direction, and wherein the angles of the apexes of the triangularly-shaped orifices are between about 10° and about 65°.

* * * * *